Aug. 30, 1966 LE ROY H. DIEMOND 3,268,977
TOOL HOLDER AND INSERT
Filed Feb. 13, 1964 2 Sheets-Sheet 1

INVENTOR.
LEROY H. DIEMOND
BY
McCormick, Paulding & Huber
ATTORNEYS

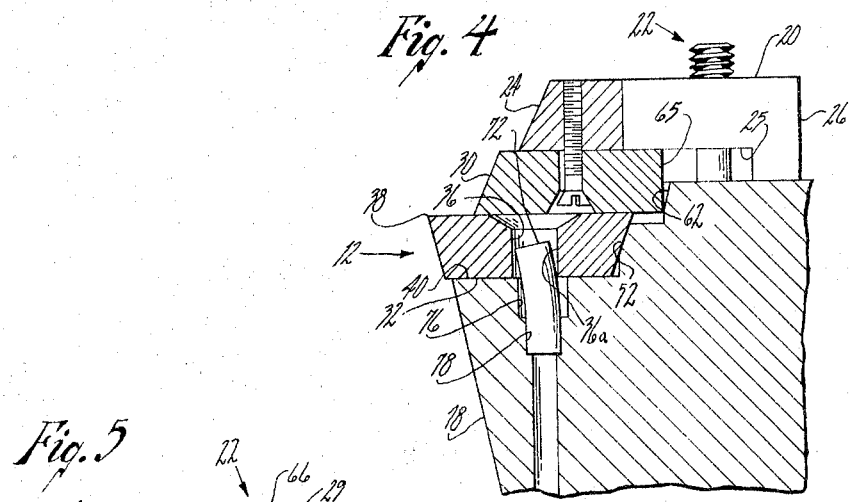
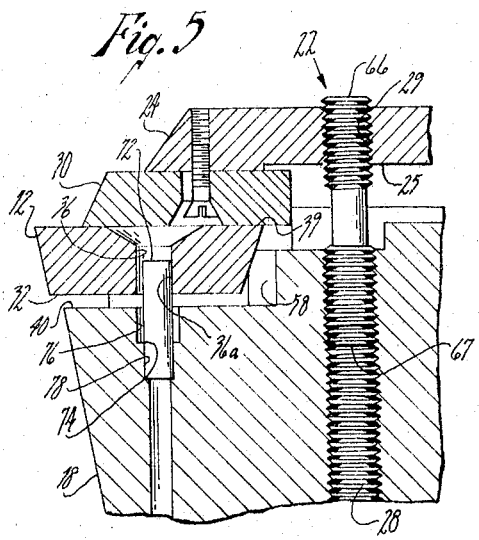
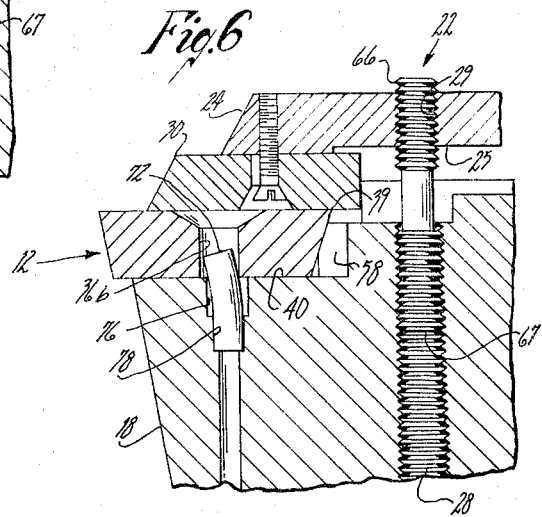

United States Patent Office 3,268,977
Patented August 30, 1966

3,268,977
TOOL HOLDER AND INSERT
LeRoy H. Diemond, 82 Arnold Drive,
East Hartford, Conn.
Filed Feb. 13, 1964, Ser. No. 344,688
8 Claims. (Cl. 29—96)

This invention relates to cutting tools and more particularly to a tool of the "clamp-on" variety wherein a disposable cutting insert can be securely clamped between angularly related seating surfaces on a tool holder.

An object of the present invention is to provide a tool holder and a cutting insert therefor wherein the cutting force of the advancing cutting tool on the work being machined reacts through these members in a very efficient manner so as to substantially reduce the likelihood of structural failure of the insert.

Another object of the present invention is to provide a cutting insert which can be clamped to a holder in any one of a plurality of positions so as to permit the use of more than one cutting edge without any readjustment of the machine as would be required if the tool holder itself had to be removed.

Another object of the present invention is to provide a tool holder which permits a chip breaker to be positioned above an insert and also allows the insert to be removed and reinstalled in the holder without affecting the pre-existing adjustment of the chip breaker in relation to the selected cutting edge of the insert.

Still another object of the present invention is to provide a cutting insert which has a plurality of angularly related surfaces adapted to seat upon complementary surfaces on a tool holder so as to be frictionally held in a particular position whereat a cutting edge is presented for machining a workpiece.

The drawings show a preferred embodiment of the invention and such embodiment will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 4 is an enlarged sectional view of the FIG. 1 device taken along the line 4—4 of FIG. 2;

FIG. 5 is an enlarged sectional view of the FIG. 1 device taken along the line 5—5 of FIG. 2; and FIG. 6 is a view similar to FIG. 5 but showing the various parts in clamped relation.

Figure 1:
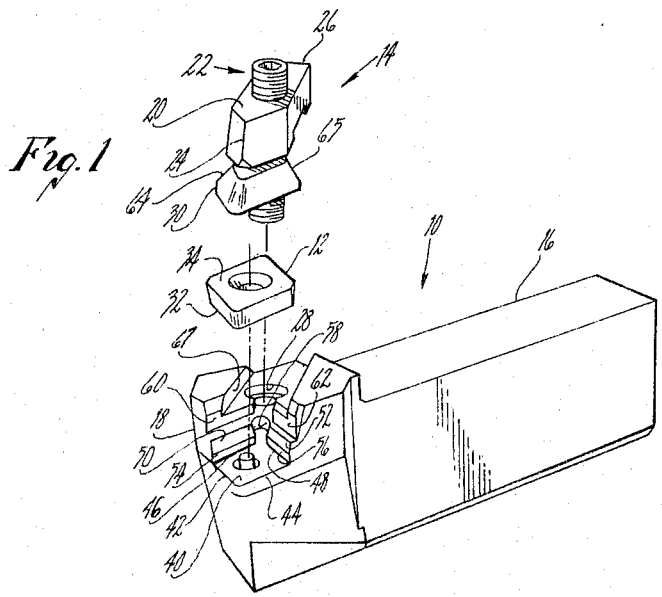
FIG. 1 is an exploded perspective view of a cutting tool of the present invention.

Referring now to FIG. 1 in greater detail, a cutting tool is there shown in disassembled relation as comprising a tool holder 10, a cutting insert 12, and clamping means 14 for securing the insert to the holder. The holder 10 has an elongated shank portion 16 of generally rectangular cross section which is adapted to be held in the tool post of a lathe or other machine. A head portion 18 is integrally connected to one end of said shank portion and defines a platform for the insert 12 which will be described in detail hereinbelow.

The clamping means 14 comprises a clamping member 20 which carries a screw 22 intermediate its front and rear ends, 24 and 26 respectively. The screw 22 is adapted to be threadably received in an opening 28 provided in the head portion 18. A chip breaker 30 is attached to the lower forward end of the clamping member 20 and the cutting insert 12 is adapted to be releasably clamped between the chip breaker 30 and the platform area of said head portion 18 by advancing the screw 22 in the threaded opening 28. The clamping member is provided with a slight undercut portion 25 on the lower surface intermediate the front 24 and rear 26 ends thereof to assure that the insert 12 is securely clamped to the head portion 18 and that rough edges or the like on the chip breaker do not interfere with the operation of the clamping means 14.

The cutting insert 12 shown is generally quadrilateral plan form, and more particularly, this insert is rhomboidal in planform and trapezoidal in cross section having parallel bottom and top surfaces 32 and 34 respectively. The side surfaces of the inserts are tapered at a uniform angle downwardly and inwardly as best shown in FIGS. 1 and 4. A cylindrical opening or bore 36 is provided in the bottom surface 32 of the insert and generally centrally thereof for a purpose to be discussed hereinbelow. The top surface 34 of the insert in conjunction with the two exposed side surfaces at the front of the head portion 18, best shown in FIG. 2, define a first cutting edge 38. Although the generally quadrilateral plan form shown is a desirable one certain other polygonal forms may be found useful.

Turning now to the head portion 18 in greater detail, a bottom seating surface 40 is defined at a forward portion thereof and has first and second front edges, 42 and 44 respectively, and first and second rear edges 46 and 48 respectively. Thus, the seating surface 40 is generally horizontal and at least approximately quadrilateral in planform as shown. The shape of the front edges 42 and 44 is not critical however and this portion of the quadrilateral may take other shapes without departing from the scope of the invention. The rear edges 46 and 48 however must be straight and preferably include an acute angle therebetween, which angle is equal to the acute angle defined by the rhomboidal cutting insert 22.

First and second rear seating surfaces, 50 and 52 respectively, are also provided adjacent the rear edges 46 and 48 and these rear seating surfaces are inclined upwardly and rearwardly with respect to the bottom seating surface 40 to fit the tapered rear side surfaces of the cutting insert 12. From FIG. 1 it will be apparent that the bottom seating surface 40 and the rear seating surfaces 50 and 52 are not connected to one another but rather are separated by suitable clearance surfaces 54 and 56 and a clearance hole 58 all of which assure that the complementary surfaces of the insert 22 mate with the seating surfaces, 50 and 52, in the head portion 18.

Also as shown in FIGS. 1 and 4, angularly related surfaces 60 and 62 are provided in the head portion for accommodating the chip breaker 30. The surfaces 60 and 62 are located above the just described insert seating surfaces and are stepped rearwardly with respect thereto and arranged generally perpendicular to the bottom surface 40. Upper portions of these surfaces, 60 and 62, are beveled as shown in FIGS. 1 and 4 to facilitate the assembling of the various parts. As so constructed, cutting inserts which become worn from use can be squared off at contiguous sides 64 and 65 for use as chip breakers. The angle included between these sides is preferably kept the same as that between the related side surfaces of the insert and thus the angular relation of the surfaces 60 and 62 in the head portion is the same as that between the inclined insert seating surfaces 50 and 52.

Figure 2:
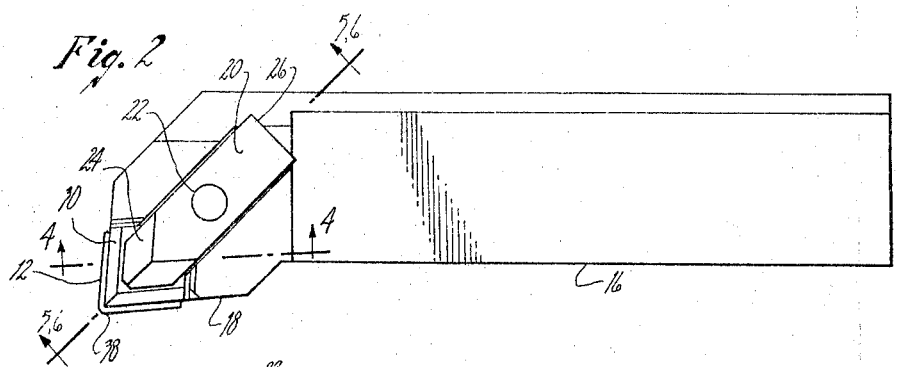
FIG. 2 is a top view of the FIG. 1 device.
Figure 3:
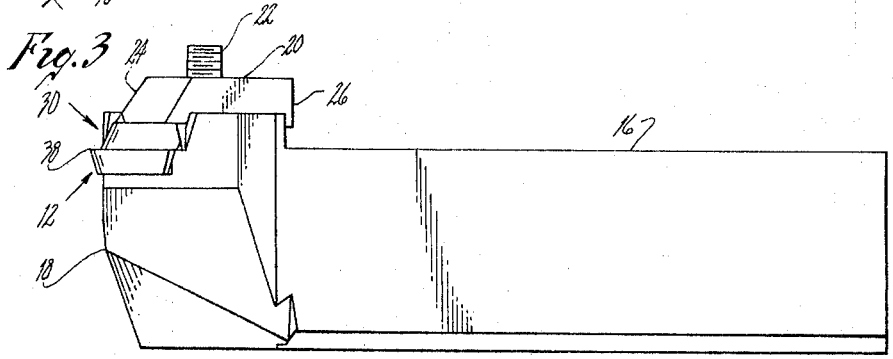
FIG. 3 is a side view of the FIG. 1 device.

As best shown in FIG. 2 the head portion 18 is not axially aligned with the shank portion 16 but is offset to the right when looking at the forward end of the tool. This feature is intended to be illustrative only and the head portion could as well be made offset at any convenient angle to the left or right, or with no offset, without departing from the scope of the invention. The clamping member 20 is arranged at an angle to the axis of the shank portion 16 and a groove 67 is provided in the head portion to accommodate this member. This groove provides lateral support for the clamping member and prevents the same from turning when torque is applied to the screw 22. The latter will be seen to have two threaded portions at either end thereof as best shown in FIGS. 5 and 6. An upper threaded portion 66 is left-handed in rotative sense and adapted to be threadably received in an opening 29 in the clamping member 20. A lower threaded portion 67 is right-handed in rotative sense and adapted to be threadably received in the opening 28 in the tool holder head portion 18. As so arranged the screw 22 can be advanced relative to the head portion 18 by conventional clockwise rotation and the insert 12 releasably secured to the tool holder 10.

Turning now to the construction of the bottom seating surface 40 in greater detail an upstanding cylindrical post 72 is provided in a recess 74 which has upper and lower cylindrical portions 76 and 78 respectively. The lower portion 78 is of such a diameter that the post is adapted to be pressed therein at assembly while the upper cylindrical portion 76 is of somewhat greater diameter to permit lateral flexing of the post 72.

As so constructed the bottom surface 32 of the cutting insert 12 is adapted to seat upon the bottom surface 40 of the head portion 18. The upstanding post 72 is so located with respect to the opening 36 in the insert that when the rear side surfaces of the latter have engaged the inclined seating surfaces 50 and 52, the post is engaged and flexed forwardly by a rear wall 36a of said opening as the bottom surfaces 32 and 40 contact each other. It is an important feature of the present invention that the post 72 in conjunction with the cooperating wall of the insert opening 36 provides a lateral force tending to urge the insert rearwardly and into engagement with the said rear seating surfaces. The degree of taper provided on the rear side surfaces of the insert is such that the insert is frictionally held by the complementary rear seating surfaces. This taper angle is preferably on the order of 12°, and in any event in the range of 7–15°, so that the insert will not tend to slide relative to the rear seating surfaces. This arrangement of complementary tapered parts can be compared to the partial locking taper well known in the machine tool art. The present invention utilizes the same principle but does not require that the tapered surfaces surround the part to be held. The flexible post replaces one half the structure normally required and in effect the cutting insert is held by the complementary tapered surfaces of the insert and the head portion in cooperation with the post and the rear wall of the insert opening. As so constructed the insert will remain frictionally held in the head of the tool holder after the clamping means has been loosened or removed. Thus, the insert will not fall out of its seat during replacement of the chip breaker or when the various parts are to be disassembled for any reason. When the insert itself is to be removed, for reversing its position or for replacement with a new insert, this can be readily accomplished by applying slight upward thumb pressure to the exposed cutting edge of the insert.

Another feature of the present invention relates to the symmetry of the cutting insert about the shorter diagonal of its generally rhomboidal planform. From the drawings, it will be apparent that the rear side surfaces, in conjunction with the top surface of the insert, define a second cutting edge 39 which can be used in place of the first cutting edge 38. Also in this connection it should be noted that since all of the side surfaces of the insert 12 are similarly tapered, the front side surfaces thereof can be engaged by the rear seating surfaces if the insert is placed in a second insert position similar to that described hereinabove but with said second cutting edge 39 exposed in place of the first cutting edge 38. Finally, in connection with the second or alternative insert position it will be apparent that the centrally located bore 36 in the bottom surface 32 of the insert has a front wall 36b which is similar in all respects to said rear wall 36a and which cooperates with the upstanding post 72 to urge the insert rearwardly and into engagement with the rear seating surfaces.

Finally, and still with reference to the cutting insert 12, the centrally located opening or bore 36 will be seen to extend through the insert and to be countersunk at the upper end as best shown in FIGS. 4, 5 and 6. An advantage of this construction lies in the possible double use of this element as mentioned hereinabove. As shown the chip breaker 30 is attached to the clamping member 20 by a flat head screw and, accordingly, the countersink in the insert permits it to be easily adapted for use as a chip breaker by merely grinding two flat surfaces at two of the angularly related sides.

The invention claimed is:

1. A cutting tool comprising a tool holder having shank and head portions the latter of which defines a bottom seating surface, said seating surface having angularly related first and second rear edges arranged as a contiguous pair, said head portion also defining angularly related first and second rear seating surfaces disposed respectively adjacent said rear edges of said bottom seating surface and inclined upwardly and rearwardly with respect thereto, a cutting insert which has a bottom seating surface and angularly related first and second rear seating surfaces all of which surfaces are at least approximately complementary to the corresponding seating surfaces on said head portion, said cutting insert also having an opening therein with a rear wall at least approximately normal to the bottom seating surface thereof, and said bottom seating surface on the head portion being provided with a cooperating upstanding post, said opening rear wall and post being spaced forwardly respectively from the rear seating surfaces on the insert and the rear seating surfaces on the head portion in such manner that the post is engaged and flexed forwardly by the wall when the insert is urged downwardly and seated in the head portion, and a clamping means engageable with the head portion and the insert and operable to seat the insert.

2. A cutting tool as set forth in claim 1 wherein said cutting insert is of generally quadrilateral plan form and generally trapezoidal in cross section having a top surface parallel to said bottom seating surface, a first cutting edge defined by first and second front surfaces and said top surface, said first and second front insert surfaces being identical to said first and second rear seating surfaces respectively, which latter surfaces define a second cutting edge in conjunction with said top surface, said front insert surfaces being so angularly related to one another and so inclined with respect to the bottom surface thereof that when said insert is positioned with said front surfaces facing rearwardly in a second insert position the said front surfaces are complementary to the inclined rear seating surfaces of said head portion, and said insert opening having a front wall approximately normal to said bottom seating surface thereof and so located with respect to said front insert surfaces that said post is engaged and flexed forwardly by said front wall when the insert is clamped in said second position.

3. A cutting tool as set forth in claim 1 wherein said cutting insert is rhomboidal in planform, and wherein said angularly related first and second rear seating surfaces include an acute angle therebetween, said insert having first and second front surfaces which define a first cutting edge in conjunction with the top surface of said insert, said front surfaces being identical to said rear seating surfaces which latter surfaces define a second cutting edge in conjunction with said top surface, said front insert surfaces being so inclined with respect to the bottom surface thereof that when said insert is positioned with said front surfaces facing rearwardly in a second insert position the said front surfaces are complementary to the inclined rear seating surfaces of said head portion, and said insert opening comprising a centrally located cylindrical bore normal to the bottom surface of the insert so that said post is adapted to be engaged by the wall of said bore and to be flexed forwardly when the insert is clamped in either of said insert positions.

4. A cutting tool as set forth in claim 1 wherein said clamping means comprise a clamping member, a threaded opening defined in the upper surface of said tool holder head portion, and a screw carried by said clamping member and adapted to be threadably received in said opening.

5. A cutting tool as set forth in claim 4 wherein said clamping means also includes a chip breaker carried by said clamping member and releasably attached thereto by a second screw threadably received in a threaded opening in said clamping member, which chip breaker has a lower surface adapted to contact the top surface of said cutting insert when the latter is seated.

6. A cutting tool as set forth in claim 3 wherein said upstanding post is a separate member attached to said head portion by a press fit between a lower portion of a cylindrical bore in said head portion and the post, said bore having an upper portion of somewhat larger diameter to permit said post to flex at least in said forward direction.

7. A cutting tool comprising a tool holder having a bottom seating surface and angularly related rear seating surfaces extending upwardly therefrom, a resilient post pressed into a bore defined in said holder, which bore is located in said bottom seating surface in spaced relation to said rear seating surfaces, said post having a smaller diameter than said bore adjacent the bore upper portion to permit said post to flex at least in a forward direction, a cutting insert having a bottom surface and at least two angularly related contiguous side surfaces for engaging said holder defined surfaces, said insert side surfaces being inclined downwardly and toward the center of the insert, said insert having a centrally arranged opening normal to said bottom surface thereof and spaced from said side surfaces thereof, and insert clamping means for seating said insert in said holder so that said post is engaged by the opening defining portion of said insert and flexed forwardly to urge said insert rearwardly as it is clamped downwardly.

8. A cutting tool as set forth in claim 7 wherein said holder defined rear seating surfaces are inclined upwardly and rearwardly at an angle complementary to the inclination of said insert side surfaces, and wherein said insert is quadrilateral in planform with all of its side surfaces inclined at an angle in the range of 7–15 degrees.

References Cited by the Examiner
UNITED STATES PATENTS
2,598,581   5/1952   McKenna _____ 29—96

WILLIAM W. DYER, JR., *Primary Examiner.*

HARRISON L. HINSON, *Examiner.*